(No Model.) 2 Sheets—Sheet 1.

W. J. HARRIS.
DISK CULTIVATOR.

No. 547,254. Patented Oct. 1, 1895.

Witnesses:
F. G. Fischer
G. Y. Thorpe

Inventor
Wade J. Harris,
By Higdon & Higdon
Attys.

(No Model.) 2 Sheets—Sheet 2.

W. J. HARRIS.
DISK CULTIVATOR.

No. 547,254. Patented Oct. 1, 1895.

Witnesses:
F. G. Fischer
G. J. Thorpe

Inventor
Wade J. Harris,
By Higdon & Higdon.
Attys

UNITED STATES PATENT OFFICE.

WADE J. HARRIS, OF FULTON, MISSOURI.

DISK CULTIVATOR.

SPECIFICATION forming part of Letters Patent No. 547,254, dated October 1, 1895.

Application filed April 26, 1895. Serial No. 547,169. (No model.)

*To all whom it may concern:*

Be it known that I, WADE J. HARRIS, of Fulton, Callaway county, Missouri, have invented certain new and useful Improvements in Disk Cultivators, of which the following is a full, clear, and exact description, reference being had to the accompanying drawings, forming a part thereof.

My invention relates to disk cultivators, and my objects are to produce, first, an axle for each gang of disks, which may be adjusted to cause the disks to always maintain their perpendicular or vertical disposition and cut the soil at a uniform depth irrespective of its surface—that is, whether the machine be working level or sidling ground; secondly, which may be adjusted to cause the disks, while always occupying a vertical plane, to cut the soil at varying depths, so that the work is distributed among all of the disks and all of the soil is broken when cultivating between rows of corn.

With these objects in view and others, as will hereinafter appear, the invention consists in certain novel and peculiar features of construction and combinations of parts, as will be hereinafter described and claimed.

In order that the invention may be fully understood, I will proceed to describe it with reference to the accompanying drawings, in which—

Figure 1:
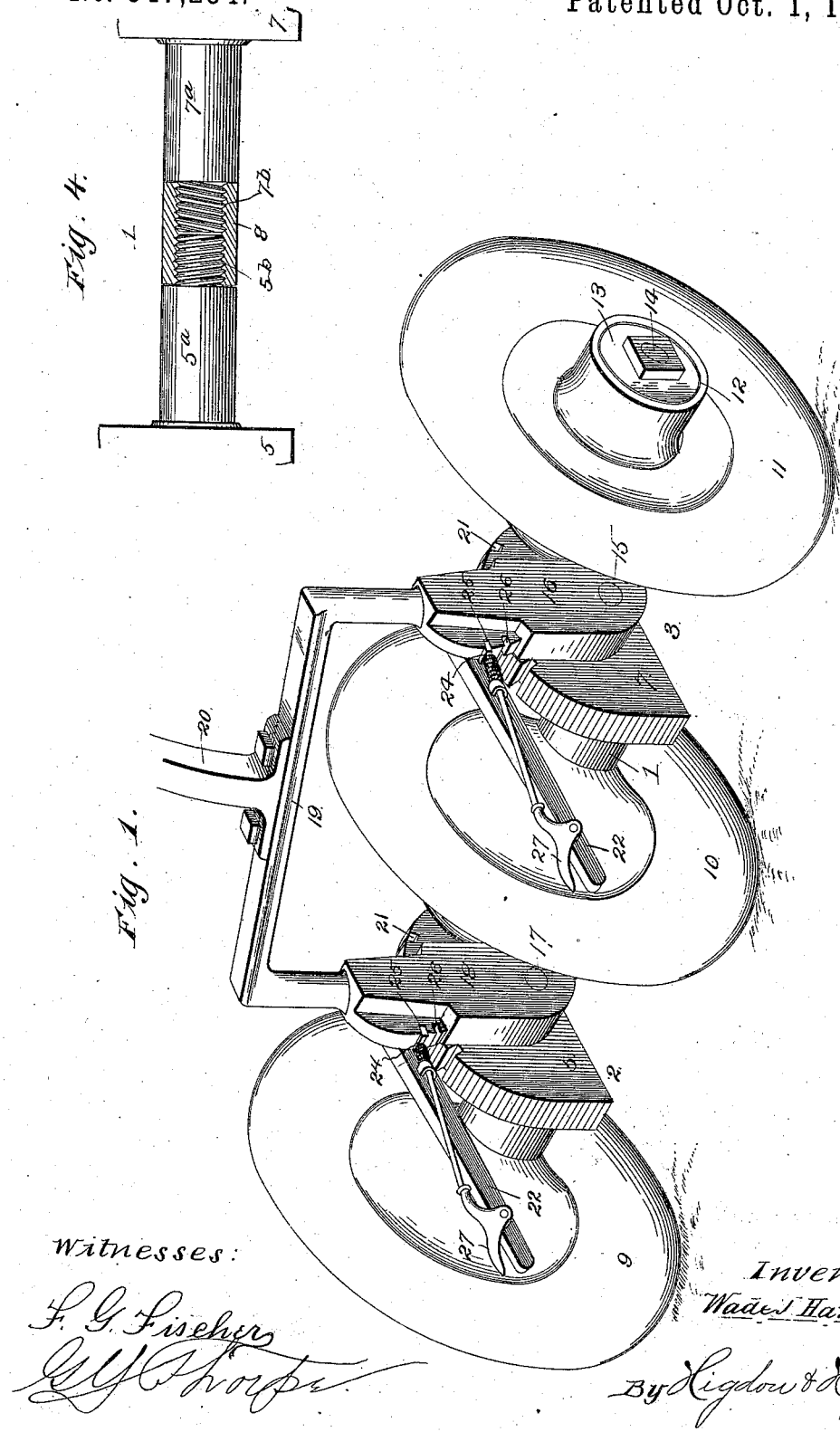
Figure 2:
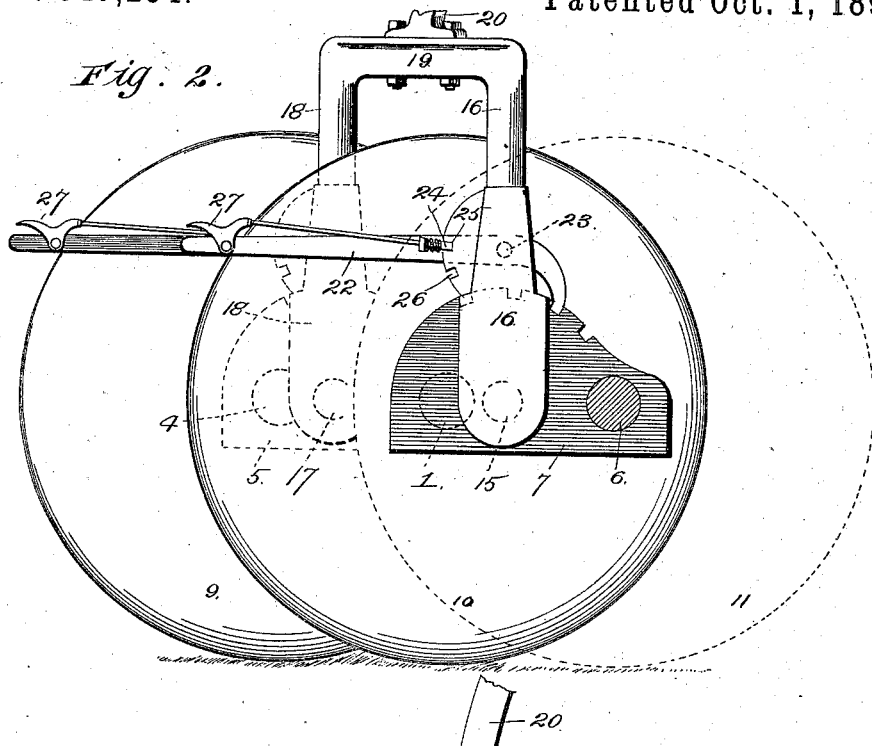
Figure 3:
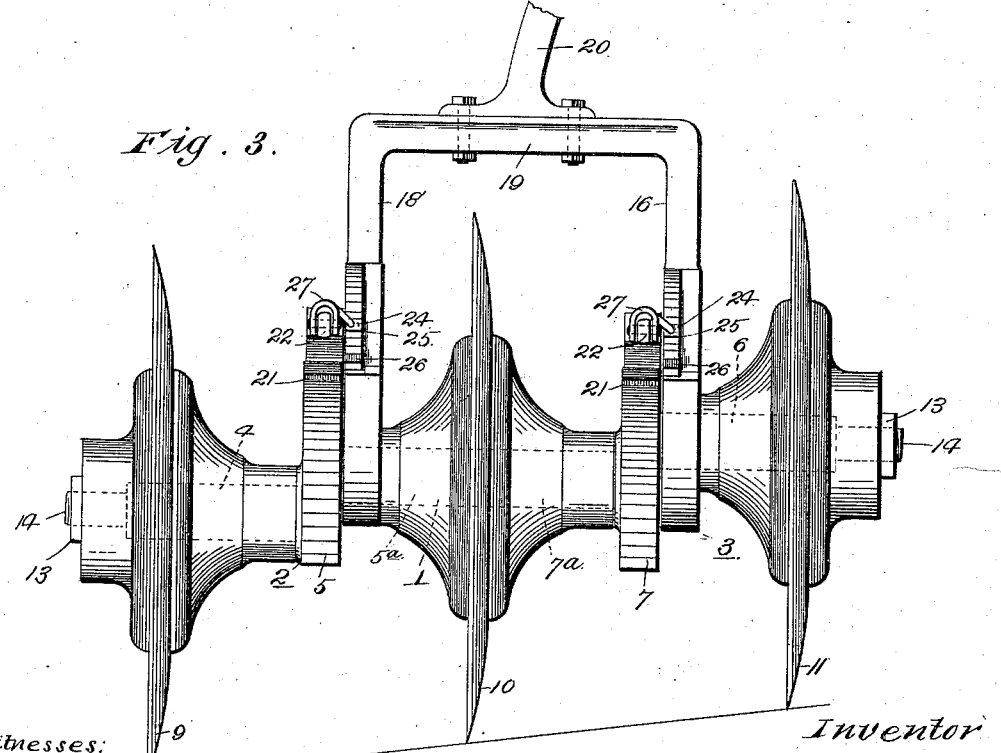

Figure 1 represents a perspective view of a gang of disks mounted upon a shaft embodying my invention, and also shows devices for locking said disks at any desired point in their adjustment relative to each other. Fig. 2 is a sectional view of the same, taken inward of one of the end disks. Fig. 3 is a rear view of the same, taken at an angle to the line of draft. Fig. 4 is a view, partly in elevation and partly in section, which shows the manner of connecting the sections which form my improved shaft.

In the said drawings, where similar numerals designate corresponding parts, 1 designates the middle portion, 2 a crank at one end thereof, and 3 a similar crank at the opposite end of the middle portion. Said crank 2 comprises the spindle 4 and the arm 5, which extends at right angles to the spindle, and is mounted rigidly near its opposite end upon one end of the middle portion. The crank 3 is of similar construction, comprising the spindle 6 and the arm 7, extending at right angles thereto at one end and mounted rigidly at its opposite end upon the other end of the middle portion. The said middle portion comprises a section $5^a$, projecting from the arm 5, and the section $7^a$, projecting from the arm 7, and said sections are provided, respectively, with the right and left hand threaded stems $5^b$ and $7^b$, respectively. Said stems diametrically are smaller than the body portions of the sections and are operatively connected or coupled together by means of the cylindrical coupling-nut 8, which corresponds in diameter with the said sections $5^a$ and $7^a$ and forms a part of said middle portion of the shaft. Mounted rotatably in the ordinary manner upon the spindle 4, the middle portion, and the spindle 6 of said shaft are the usual soil cutting or turning disks 9, 10, and 11, respectively, said disks being arranged in the ordinary manner at an angle to the line of draft.

The outwardly-projecting hub portions of the end disks are recessed or hollowed out, as shown at 12, to receive clamping-nuts 13, which engage the diminished threaded ends 14 of the spindles 4 and 6 of the shaft. At a suitable point in the plane of the axes of the middle portion 1 and the spindle 6 of the shaft is pivoted at 15 the lower end of a vertical arm or standard 16. At a corresponding point, as at 17 on the arm 5, relative to the axes of the middle portion and the spindle 4 is pivoted the lower end of a similar vertical arm 18, and said arms are connected at their upper ends by the bridge portion 19, and bolted or otherwise properly secured to said bridge portion 9 is one end of the arch 20, only a portion of which is shown, and this arch may be of the usual or any preferred construction or configuration, which connects one disk gang with another and bridges the row of corn being cultivated, the disk gangs operating, of course, at opposite sides of a row of corn and between said row and the contiguous or adjacent rows. While I have described and shown the arms or standards 16 and 18 connected by a cross-bar, which in turn is connected to the arch, it is to be distinctly understood that I do not wish to confine myself to this or any other particular construction, and that an independent cross-bar 19 may be dispensed with by connecting the arch directly to said arms or standards. The crank-arms 5 and 7 are marginally curved for a part of their length and in such curved periphery are notched at intervals, as shown at 21, said series of notches being arranged preferably concentric to the axes of the pivots of said vertical arms or standards, and engaging one or another of said notches are the toes or teeth of the levers 22, pivotally connected, as at 23, to the side of the said standards and at a suitable height vertically above said crank-arms. These levers are locked in their engagement with any of said notches by means of the spring-actuated dogs 24, engaging the notches 25 of the segmental projections of said vertical arms or standards, and may be locked out of adjustment with said notched crank-arms by the engagement of said dogs with the notches 26 of the segmental projections. To cause the disengagement of said dogs with either of said notches 25 or 26, grip-levers 27 are connected to the outer ends of said dogs and are pivotally mounted upon said levers 22. It is apparent from the foregoing that when the parts occupy the relative positions shown most clearly in Fig. 2 the levers 22 cannot be disengaged from their engaging notches of said crank-arms until the spring-actuated dogs 24 be first withdrawn from engagement with the notches 25, so that the disks are locked in the relative positions shown. When it is desired, however, to cause said disks to operate at a uniform depth in sidling or inclined ground, as shown in Fig. 3, the lever 22, controlling the right-hand disk of the gang, as viewed from the rear, is grasped and disconnected from the crank-arm 7 after first withdrawing the dog 24 from the notch 25. The right-hand section of the shaft, which comprises the section 7ª of the middle portion, the crank-arm 7, and the spindle 6, is now rotated slightly to raise the right-hand disk to the proper height relative to the middle disk, and it is secured in such position by causing the re-engagement of the lever 22 with the proper notch in said segment. At the same time the left-hand disk is lowered a suitable distance to cause the lower edges of the soil cutting or turning disks to lie in or approximately in the same plane as the sidling ground, when it is locked in such position by its corresponding lever 22, said levers 22 being both locked, as hereinbefore described, by spring-actuated dogs. It will be noticed that the sections of the shaft are thus adjusted without changing the perpendicular arrangement or disposition of said disks in the slightest degree, so that they are permitted to cultivate sidling ground or soil at a uniform depth and with the least possible friction—much less than is possible where the disks run at right angles to the surface of the soil under cultivation, whether it be level or sidling. It is apparent, also, that the soil may be cultivated, because of this perpendicular disposition being always maintained, much nearer to the plants than with the disks when they are out of the perpendicular, as is the case with all the cultivator-disks now in use to my knowledge. Another obvious advantage of my shaft adjustment lies in the fact that it will more thoroughly work the ground under all conditions when hilling up the corn than disk cultivators having the permanently-arranged disks, because with my construction no space is left uncultivated in the middle between the rows and less ground surface at the roots of the young corn is left to harden. Furthermore, by maintaining the disks in the perpendicular when traveling upon sidling or ground having a surface irregular or uneven the burden or labor of the draft-animals is not increased, as is usually the case when such ground is under cultivation with cultivators of the ordinary construction. It will be noticed, also, as the levers 22 and the spring-actuated dogs project directly to the rear that they do not clog or afford any obstruction to the free operation of the disks by lying in the path of the soil as it is turned by said disks.

From the above construction, taken in connection with the drawings, it will be apparent that I have produced a shaft for soil cutting or turning disks and means for adjusting the same, as described, which is simple, strong, durable, and inexpensive of construction and is positive and reliable in operation.

It is to be understood that various changes in the form, proportion, and detail construction of the parts may be resorted to without departing from the essential spirit and scope or sacrificing any of the advantages of my invention.

Having thus described my invention, what I claim as new, and desire to secure by Letters Patent, is—

1. In a disk-cultivator, a crank-shaft, comprising a middle-portion, and spindles connected to and eccentrically of said middle-portion; said crank-shaft comprising two sections operating independently of each other, a disk mounted rotatably upon the middle-portion, and disks mounted rotatably upon said spindles, substantially as described.

2. In a disk-cultivator, a crank-shaft, comprising a middle-portion, and spindles connected to and eccentrically of said middle-portion; said crank-shaft comprising two sections operating independently of each other, a disk mounted rotatably upon the middle-portion, disks mounted rotatably upon said spindles, and means for locking said disks at any point within their adjustment, substantially as set forth.

3. In a disk-cultivator, a suitable framework provided with depending arms or standards, a crank-shaft comprising a middle-portion, eccentrically-extending spindles, and crank-arms connecting said middle-portion and said spindles, and pivotally connected to said depending arms or standards; said crank-shaft consisting of sections coupled together whereby one of said spindles may be raised or lowered independently of the other, a disk mounted upon the middle-portion of said shaft, and disks mounted upon the spindles of the same, levers carried by said arms or standards and adapted to engage notches in said crank-arms, and means to lock said levers in engagement or out of engagement with the notches of said crank-arms, substantially as set forth.

4. In a disk-cultivator, a suitable framework provided with depending arms or standards, a crank-shaft comprising a middle-portion, eccentrically-extending spindles, and crank-arms connecting said middle-portion and said spindles, and pivotally connected to said depending arms or standards; said crank-shaft consisting of sections coupled together whereby one of said spindles may be raised or lowered independently of the other, a disk mounted upon the middle-portion of said shaft, and disks mounted upon the spindles of the same, levers carried by said arms or standards and adapted to engage notches in said crank-arms, and spring-actuated dogs carried by said levers and engaging upper and lower notches in said arms or standards, accordingly as the said levers are locked in or out of engagement with the notched crank-arms, substantially as set forth.

5. In a disk-cultivator, a crank-shaft, comprising end-spindles, crank-arms projecting therefrom, and a middle-portion consisting of a pair of sections, one of them projecting from each of said crank-arms, and one terminating in a right-hand threaded stem and the other in a left-hand threaded stem, and a sleeve or collar internally threaded to engage said right- and left-hand threaded stems to bind said sections together, and having its external diameter corresponding to the external diameter of said sections, substantially as set forth.

In testimony whereof I affix my signature in presence of two witnesses.

WADE J. HARRIS.

Witnesses:
D. B. LOVELACE,
W. P. ROBISON.